United States Patent
Bui et al.

(10) Patent No.: US 6,745,269 B2
(45) Date of Patent: Jun. 1, 2004

(54) METHOD AND APPARATUS FOR PRESERVATION OF DATA STRUCTURES FOR HARDWARE COMPONENTS DISCOVERY AND INITIALIZATION

(75) Inventors: Tam D. Bui, Austin, TX (US); George John Dawkins, Austin, TX (US); Van Hoa Lee, Cedar Park, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/758,736

(22) Filed: Jan. 11, 2001

(65) Prior Publication Data

US 2002/0099876 A1 Jul. 25, 2002

(51) Int. Cl.⁷ .................... G06F 13/00; G06F 15/177; G06F 1/24
(52) U.S. Cl. .................. 710/104; 713/1; 713/2; 713/100
(58) Field of Search ............... 710/104; 713/1, 713/2, 100

(56) References Cited

U.S. PATENT DOCUMENTS 6,226,734 B1 * 5/2001 Kleinsorge et al. ........... 712/13
6,247,109 B1 * 6/2001 Kleinsorge et al. ........... 712/13
6,263,378 B1 * 7/2001 Rudoff et al. ................ 709/327

* cited by examiner

Primary Examiner—Tim Vo
(74) Attorney, Agent, or Firm—Duke W. Yee; Mark E. McBurney; Stephen R. Tkacs

(57) ABSTRACT

A method and apparatus preserve the data structures established in the earliest stage of initial power load, rather than each system firmware component rediscovering the hardware components of the system. Thus, the data structure is available at later stages for other firmware components. In a logical partitioning machine, the open firmware partition manager can utilize the data structure to support the partition's open firmware device tree construction. The partition manager customizes the copies of these data structures residing in the partition's memory. For hardware devices in the system but not belonging to the partition, the device information is cleared and marked invalid. After the data structures are established and updated by the earliest firmware I/O configuration component, the addresses of these structures are provided to the open firmware component. The open firmware copies these data structures to its internally safe working area and uses the copies for its normal operation. When runtime abstraction service firmware component is instantiated, the addresses of the structures of open firmware's copies are provided by the open firmware component to runtime abstraction service. Again, runtime abstraction service makes copies of these structures within its internally safe working space for its operation.

20 Claims, 4 Drawing Sheets

100 DATA PROCESSING SYSTEM

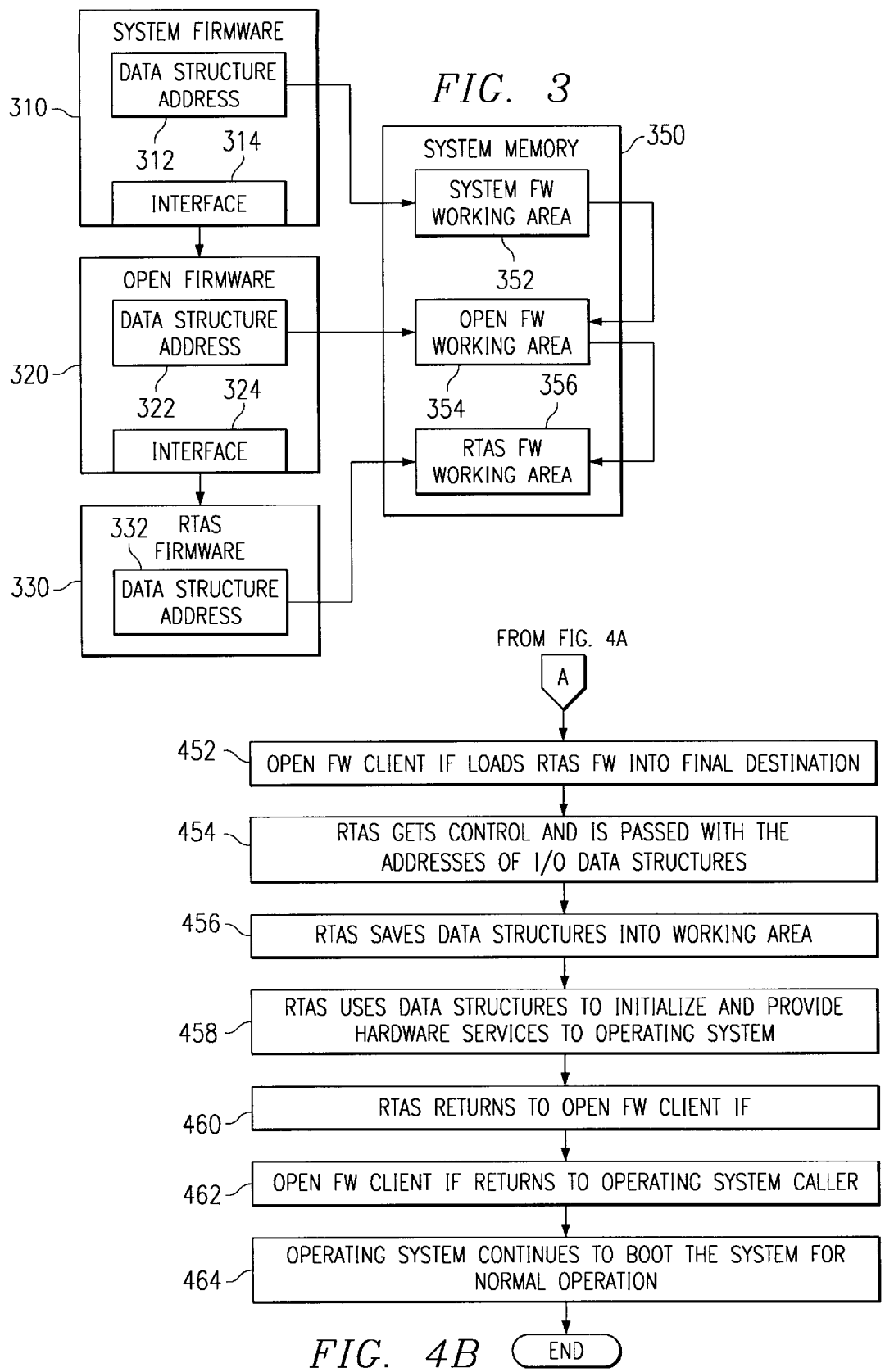

METHOD AND APPARATUS FOR PRESERVATION OF DATA STRUCTURES FOR HARDWARE COMPONENTS DISCOVERY AND INITIALIZATION

BACKGROUND OF THE INVENTION

1. Technical Field

The present invention relates generally to the field of complex input/output subsystems and, more particularly, to a method, apparatus, and program for preserving data structures for hardware components discovery and initialization.

2. Description of Related Art

In the earliest initial power load (IPL) stage, system firmware must perform hardware discovery of the input/output (I/O) subsystem, then initialize and assign system address ranges according to the system memory map for the presenting hardware. Data structures are established and updated when the discovery and initialization are complete.

Later, in the open firmware stage of the IPL, the open firmware must create its open firmware device tree based on the current hardware in the system. Thus, the open firmware must repeat the discovery of hardware components and store a data structure to describe the hardware.

Finally, in the last stage of the IPL, the runtime abstraction service (RTAS) firmware needs to know the hardware information so that it can provide services to the operating system during runtime. RTAS also analyzes and isolates hardware problems when the system encounters some error exceptions during runtime. RTAS must also perform the discovery process and create a data structure to describe the hardware.

In the prior art, the data structure is not protected and, thus, is not available for later discovery, such during operating system startup. Therefore, it would be advantageous to preserve the data structure for hardware components in memory for discovery and initialization of complex I/O subsystems, and consequently eliminate duplicate discoveries.

SUMMARY OF THE INVENTION

The present invention preserves the data structures established in the earliest stage of hardware discovery. Thus, the data structure is available at later stages for other firmware components. In a logical partitioning machine, the open firmware partition manager can utilize the data structure to support the partition's open firmware device tree construction. The partition manager customizes the copies of these data structures residing in the partition's memory. For hardware devices in the system but not belonging to the partition, the device information is cleared and marked invalid.

After the data structures are established and updated by the earliest firmware I/O configuration component, the addresses of these structures are provided to the open firmware component. The open firmware copies these data structures to its internally safe working area and uses the copies for its normal operation.

When runtime abstraction service firmware component is instantiated, the addresses of the structures of open firmware's copies are provided by the open firmware component to runtime abstraction service. Again, runtime abstraction service makes copies of these structures within its internally safe working space for its operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a firmware arrangement in accordance with a preferred embodiment of the present invention; and FIGS. 4A and 4B illustrate a flowchart of the operation of a hardware component discovery process in accordance with a preferred embodiment of the present invention.

DETAILED DESCRIPTION OF THE PREFERRED EMBODIMENT

Figure 1:
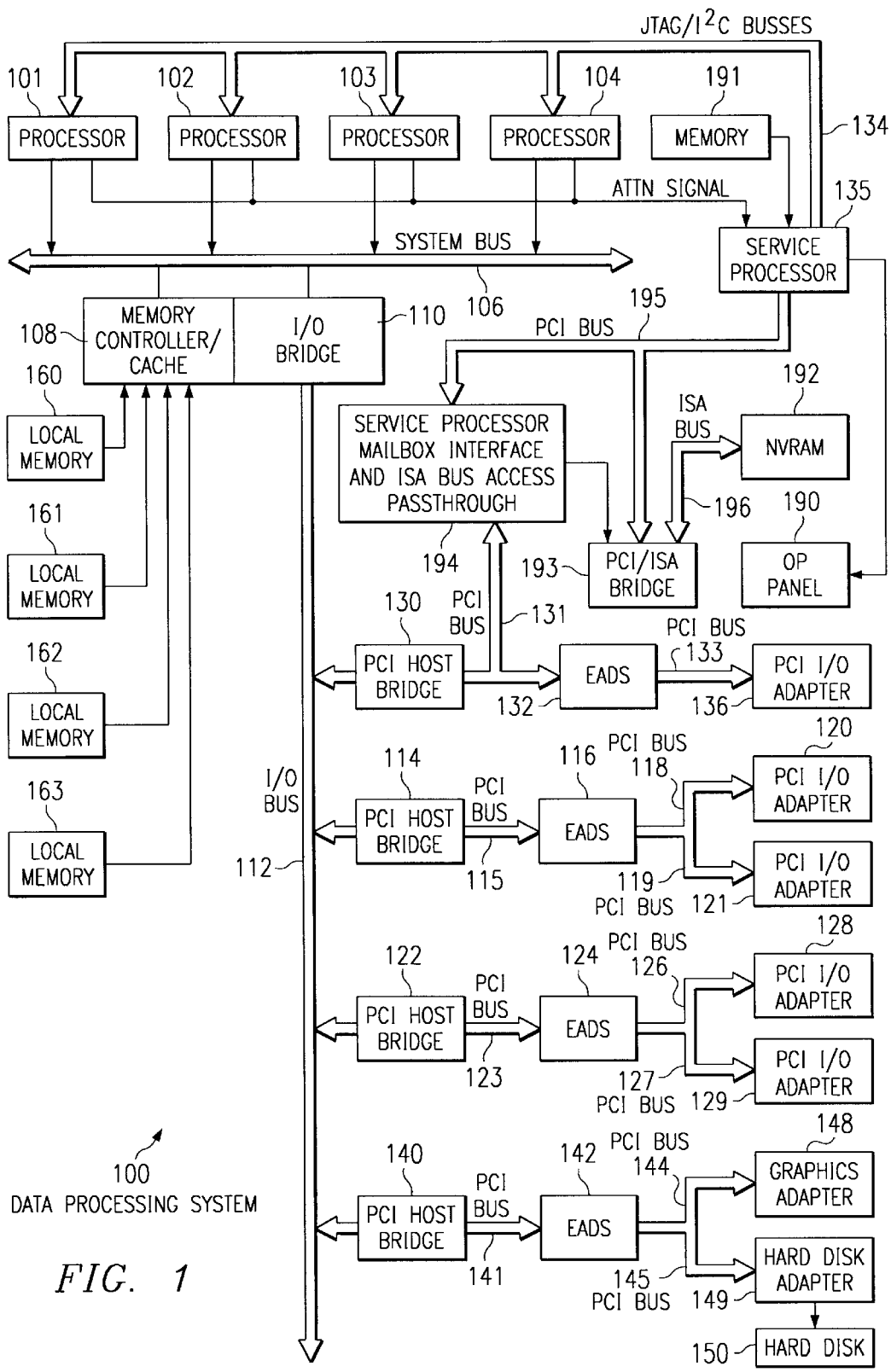
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions. Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output (I/O) adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted. EADS is the IBM internal name of a chip which provides 8 PCI-PCI bridges that support hot plugging of PCI adapters on the secondary buses.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. JTAG stands for Joint Test Action Group. This group created the foundation for IEEE 1149.1 standard describing the Test Access Port and Boundary Scan Architecture. I$^2$C stands for Inter-IC which is a bus interface specification invented by Philips.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Power Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
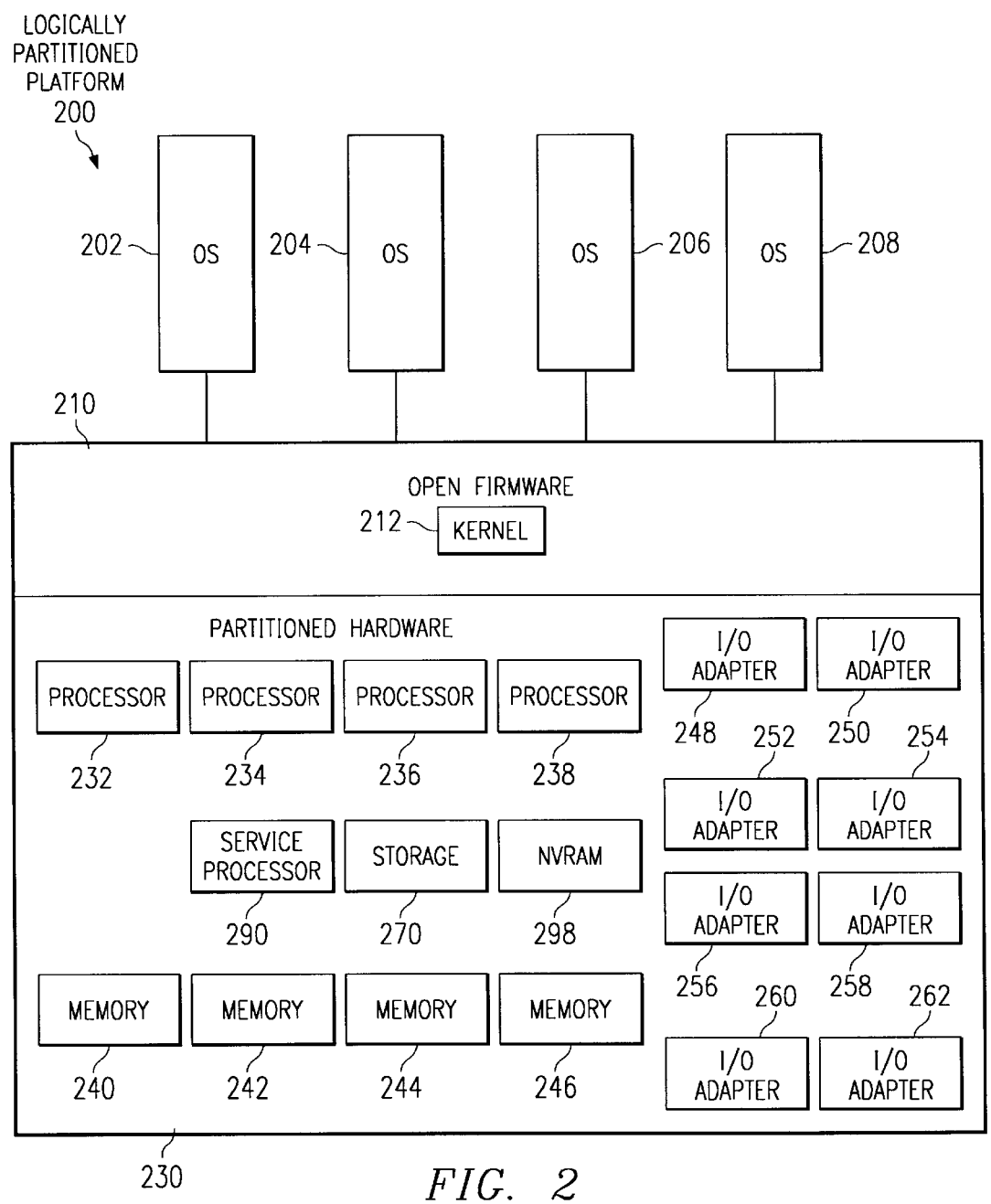
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 10 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208.

At startup, in the earliest initial power load (IPL) stage, the system firmware must perform the hardware discovery of the I/O subsystem, then initialize and assign system address ranges according to the system memory map for the presenting hardware. Data structures are established and updated when the discovery and initialization are complete.

In accordance with a preferred embodiment of the present invention, the addresses of the data structures are then provided to the open firmware component. In general, it is not guaranteed that the system memory used by these structures is safely protected by the open firmware. Therefore, the open firmware copies these structures to its internally safe working area and uses these copies for normal operation. When the RTAS firmware component is instantiated, the addresses of the structures of the open firmware copies are provided by the open firmware component to RTAS. RTAS then makes copies of these structures within its internally safe working space for its operation.

With reference now to FIG. 3, a block diagram of a firmware arrangement is illustrated in accordance with a preferred embodiment of the present invention. System firmware (FW) 310 performs hardware discovery in the earliest IPL stage and creates data structures in the system firmware working area 352 of system memory 350.

In the open firmware stage of the IPL, system firmware provides the data structure address 312 to open firmware 320 through interface (IF) 314. The open firmware then creates a copy of the data structures from the system firmware into the open firmware working area 354 of system memory 350.

When an RTAS firmware component is instantiated, open firmware 320 provides the data structure address 322 to RTAS firmware 330 through interface 324. The RTAS firmware then creates a copy of the data structures from the open firmware into the RTAS firmware working area 356 of system memory 350.

Figure 4A:
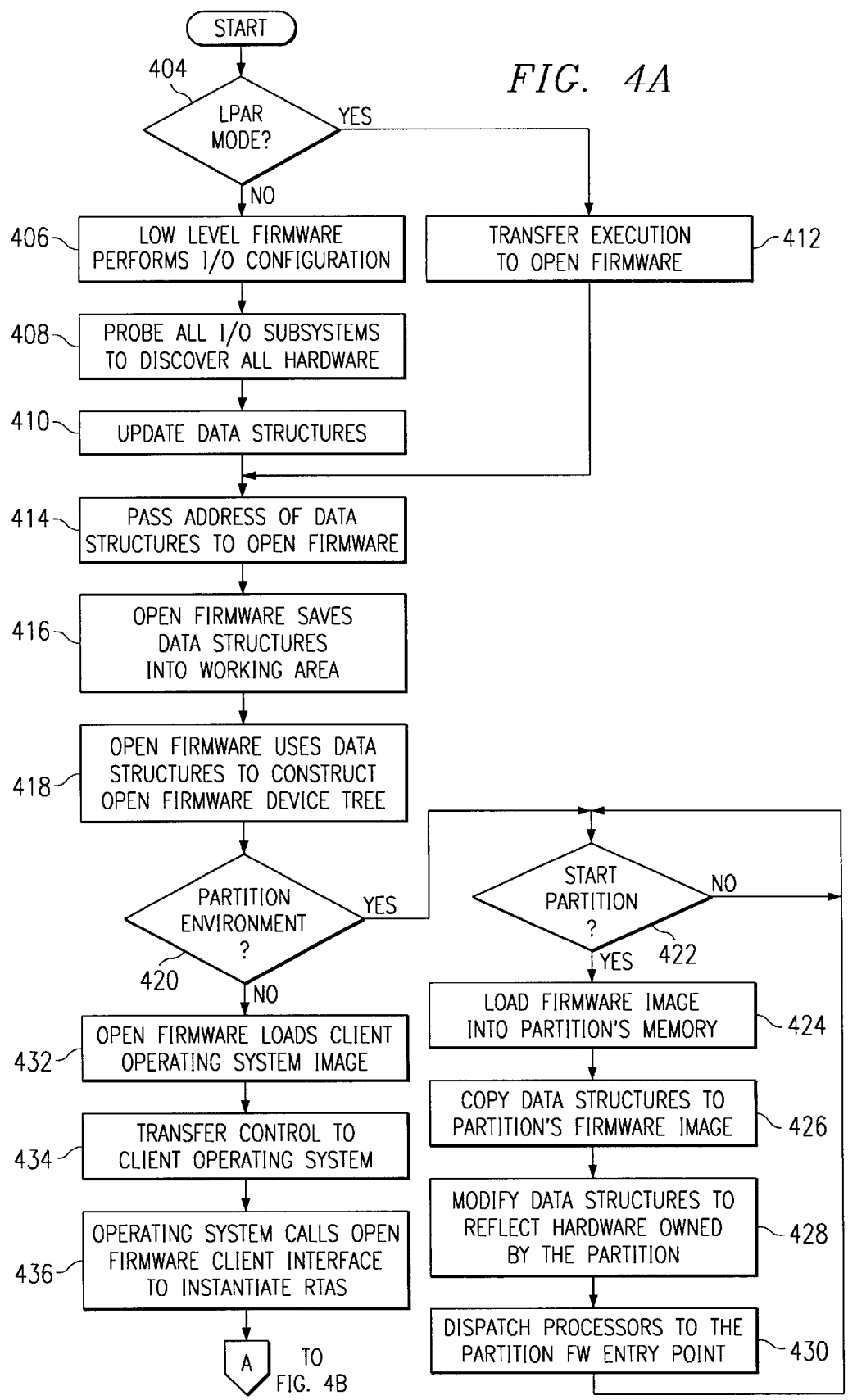

With reference now to FIGS. 4A and 4B, a flowchart of the operation of a hardware component discovery process is shown in accordance with a preferred embodiment of the present invention. Particularly with respect to FIG. 4A, the process initially begins at the earliest stage of IPL and a determination is made as to whether a logical partition (LPAR) mode exists (step 404). If an LPAR mode does not exist, low level firmware performs I/O configuration (step 406), the process probes all I/O subsystems to discover hardware (step 408), and the process updates the hardware discovery data structures (step 410). Thereafter, the process passes the address of the data structures to open firmware (step 414).

If an LPAR exists in step 404, the process transfers execution to the open firmware (step 412) and passes the address of the data structures from the system firmware to the open firmware (step 414). After the address is passed to the open firmware, the open firmware saves the data structures to its working memory (step 416) and uses the data structures to construct an open firmware device tree (step 418).

Next, a determination is made as to whether a partition environment exists (step 420). If a partition environment exists, a determination is made as to whether a partition is to be started (step 422). If a partition is to be started, the process loads firmware image into partition memory (step 424), copies data structures to the partition's firmware image (step 426), and modifies data structures to reflect hardware owned by the partition (step 428). The partition manager customizes the copies of these data structures residing in the partition's memory. For hardware devices in the system but not belonging to the partition, the device information is cleared and marked invalid. Then, the process dispatches processors to the partition firmware entry point (step 430) and returns to step 422 to determine whether a partition is to be started. When dispatched processors execute the partition firmware image, a new instance of the process in FIG. 4 is started.

If a partition is not being started in step 422, the process loops back to step 422 until a partition is to be started. This creates an endless loop, whether a partition is started or not. When a partition is started, and the processor which is currently running in this loop is assigned to that partition, and there is no more idle processor to take over this task, the current processor will suspend the current running task and dispatch itself to its partition. Sometime in the future, if a running partition ceases to exist, that partition's processors will become idle and available. Among these idle processors, one of them will compete and succeed to resume the suspended task, and go back to this endless loop. The processor will now continue monitoring for the creation of a new partition. So, there is no exit condition. If no processor is available to run this task, the task will be suspended, and then resumed at a later time when an idle processor is available to continue its execution.

Returning to step 420, if a partition environment does not exist, the open firmware loads the client operating system image (step 432) and transfers control to the client operating system (434). Thereafter, the operating system calls open firmware client interface to instantiate RTAS (step 436) and the process continues to step 452 in FIG. 4B.

In step 452, the open firmware client interface loads the RTAS firmware into the final destination. RTAS gets control and is passed with the addresses of I/O data structures (step 454). Next, RTAS saves data structures into working memory (step 456), uses the data structures to initialize and provide hardware services to the operating system (step 458), and returns to the open firmware client interface (step 460). The open firmware client interface then returns to the operating system caller (step 462). The operating system continues to boot the system for normal operation (step 464) and the process ends.

Thus, the present invention solves the disadvantages of the prior art by preserving the data structures established in the earliest stage, rather than each system firmware component rediscovering the hardware components of the system. Thus, the data structure is available at later stages for other firmware components. In a logical partitioning machine, the open firmware partition manager can utilize the data structure to support the partition's open firmware device tree construction. The partition manager customizes the copies of these data structures residing in the partition's memory. For hardware devices in the system but not belonging to the partition, the device information is cleared and marked invalid.

After the data structures are established and updated by the earliest firmware I/O configuration component, the addresses of these structures are provided to the open firmware component. The open firmware copies these data structures to its internally safe working area and uses the copies for its normal operation.

When runtime abstraction service firmware component is instantiated, the addresses of the structures of open firmware's copies are provided by the open firmware component to runtime abstraction service. Again, runtime abstraction service makes copies of these structures within its internally safe working space for its operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preserving a data structure for hardware component discovery by a system firmware component, comprising:

upon an initial discovery of at least one hardware component by said system firmware component during an initial program load (IPL) stage, creating a first data structure describing the at least one hardware component;

storing the first data structure at a first address in a first working area of memory;

providing the first address to a second firmware component;

receiving said first address at said second firmware component, said second firmware component being an open firmware component that is executed during a second IPL stage that is after said initial IPL stage;

copying by said second firmware component during said second stage, said first data structure from said first working area to a second address in a second working area of memory; and utilizing said first data structure stored at said second address by said open firmware component during execution of said open firmware component instead of said first data structure stored at said first address.

2. The method of claim 1, further comprising:

processing the first data structure in the second working area of memory by said open firmware component to form a second data structure.

3. The method of claim 1, further comprising:

providing the second address to a third firmware component.

4. The method of claim 1, further comprising:

providing said second address to a third firmware component;

receiving said second address at said third firmware component, said third firmware component being a run-time abstraction service (RTAS) firmware component that is executed during a third IPL stage that is after said second IPL stage;

copying, by said third firmware component during said third IPL stage, said first data structure from said second working area to a third address in a third working area of memory; and utilizing said first data structure stored at said third address by said RTAS firmware component during execution of said RTAS firmware component instead of said first data structure stored at either said first or second addresses.

5. The method of claim 4, further comprising:

processing said first data structure in said second working area of memory by said open firmware component to form a second data structure;

copying by said third firmware component, said second data structure from said second working area to a third address in a third working area of memory; and utilizing said second data structure stored at said third address by said RTAS firmware component during execution of said RTAS firmware component instead of said first data structure stored at said first address or said second data structure stored at said second address.

6. A method for preserving a data structure for hardware component discovery, comprising:

receiving a first address for a first working area of memory having stored therein a first data structure describing at least one hardware component discovered by a first firmware component;

copying the first data structure from said first working area to a second working area of memory corresponding to a second firmware component, wherein two copies of said first data structure exist after said copying;

transferring execution to the second firmware component, said second firmware component being executed after said transfer; and utilizing, by said second firmware component during said execution of said second firmware component, said first data structure that is stored in said second working area of memory instead of said first data structure that is stored in said first working area of memory.

7. The method of claim 6, further comprising:

processing the first data structure in the second working area of memory to form a second data structure.

8. The method of claim 6, further comprising:

providing a second address corresponding to the second working area of memory to a third firmware component.

9. The method of claim 6, wherein the first firmware component is one of a system firmware component and an open firmware component.

10. The method of claim 6, wherein the second firmware component is one of an open firmware component and a runtime abstraction service firmware component.

11. An apparatus for preserving a data structure for hardware component discovery by a system firmware component, comprising:

said system firmware component that discovers at least one hardware component and creates a first data structure describing the at least one hardware component, said system firmware component being executed during art initial program load (IPL) stage;

a memory having a first working area that stores the first data structure at a first address;

the system firmware component providing the first address to a second firmware component;

said first address being received by said second firmware component, said second firmware component being an open firmware component that is executed during a second IPL stage that is after said initial IPL stage;

said first data structure being copied from said first working area to a second address in a second working area of memory; and said first data structure that is stored at said second address being utilized by said open firmware component during execution of said open firmware component instead of said first data structure that is stored at said first address.

12. The apparatus of claim 11, further comprising:

the open firmware component processing the first data structure in the second working area of memory to form a second data structure.

13. The apparatus of claim 11, further comprising:

the open firmware component providing the second address to a third firmware component.

14. The apparatus of claim 11, further comprising:

said second address being provided by said open firmware component to a third firmware component;

said third firmware component receiving said second address, said third firmware component being a runtime abstraction service (RTAS) firmware component that is executed during a third IPL stage that is after said second IPL stage;

said first data structure being copied by said third firmware component during said third IPL stage from said second working area to a third address in a third working area of memory; and said first data structure stored at said third address being utilized by said RTAS firmware component during execution of said RTAS firmware component instead of said first data structure stored at either said first or second addresses.

15. The apparatus of claim 14, further comprising:

said first data structure in the second working area of memory being processed by said open firmware component to form a second data structure said second data structure being copied by said third firmware component from said second working area to a third address in a third working area of memory; and said second data structure stored at said third address being utilized by said RTAS firmware component during execution of said RTAS firmware component instead of said first data structure stored at said first address or said second data structure stored at said second address.

16. An apparatus for preserving a data structure for hardware component discovery, comprising:

receipt means for receiving a first address for a first working area of memory having stored therein a first data structure describing at least one hardware component discovered by a first firmware component;

copy means for copying the first data structure from said first working area to a second working area of memory corresponding to a second firmware component, wherein two copies of said first data structure exist after said copying;

transfer means for transferring execution to the second firmware component, said second firmware component being executed after said transfer; and said second firmware component utilizing during said execution of said second firmware component said first data structure that is stored in said second working area of memory instead of said data structure that is stored in said first working area of memory.

17. The apparatus of claim 16, further comprising:

means for processing the first data structure in the second working area of memory to form a second data structure.

18. The apparatus of claim 16, further comprising:

means for providing a second address corresponding to the second working area of memory to a third firmware component.

19. The apparatus of claim 16, wherein the first firmware component is one of system firmware component and an open firmware component.

20. The apparatus of claim 16, wherein the second firmware component is one of an open firmware component and a runtime abstraction service firmware component.

* * * * *